United States Patent [19]
Sharony

[11] Patent Number: 5,652,751
[45] Date of Patent: Jul. 29, 1997

[54] ARCHITECTURE FOR MOBILE RADIO NETWORKS WITH DYNAMICALLY CHANGING TOPOLOGY USING VIRTUAL SUBNETS

[75] Inventor: Jacob Sharony, Port Washington, N.Y.

[73] Assignee: Hazeltine Corporation, Greenlawn, N.Y.

[21] Appl. No.: 624,730

[22] Filed: Mar. 26, 1996

[51] Int. Cl.[6] .................. H04Q 7/36; H04J 3/14
[52] U.S. Cl. ............. 370/227; 455/445; 379/221; 340/827; 370/228
[58] Field of Search ................. 370/14, 16, 54, 370/60, 85.7, 95.1; 455/33.1; 379/58, 59, 220, 221; 340/827; 375/291

[56] References Cited

U.S. PATENT DOCUMENTS

| | | | |
|---|---|---|---|
| 3,794,983 | 2/1974 | Sahin | 370/54 |
| 5,128,934 | 7/1992 | Jasinski | 370/84 |
| 5,129,096 | 7/1992 | Burns | 455/18 |
| 5,331,637 | 7/1994 | Francis et al. | 370/54 |
| 5,343,466 | 8/1994 | Kawamura | 370/54 |
| 5,369,784 | 11/1994 | Nelson | 455/51.2 |
| 5,477,536 | 12/1995 | Picard | 370/54 |
| 5,521,909 | 5/1996 | Holloway et al. | 370/54 |
| 5,521,910 | 5/1996 | Mathews | 370/54 |
| 5,535,195 | 7/1996 | Lee | 370/54 |

OTHER PUBLICATIONS

T.C. Hou, et al., Transmission Range Control in Multihop Packet Radio Networks, IEEE Transactions on Communications, vol. COM–34 (Jan. 1986), at 38, et seq.

L. Hu, Topology Control for Multihop Packet Radio Networks, IEEE Transactions on Communications, vol. 41 (Oct. 1993), at 1474, et seq.

E.M. Gafni, et al., Distributed Algorithms for Generating Loop–Free Routes in Networks with Frequently Changing Topology, IEEE Transactions on Communications, vol. COM–29 (Jan. 1981), at 11, et seq.

M. Gerla, et al., Multicluster, mobile, multimedia radio network, Wireless Networks, 1(1995), at 255, et seq.

I. Chlamtac, et al., A Link Allocation Protocol for Mobile Multi–Hop Radio Networks, Proceedings of GLOBECOM '85, Dec. 1985, at 238, et seq.

*Primary Examiner*—Benedict V. Safourek
*Assistant Examiner*—Ricky Q. Ngu
*Attorney, Agent, or Firm*—Edward A. Onders; Leo Zucker

[57] ABSTRACT

An architecture for a radio network having nodes that are subject to dynamically changing topology such as, e.g., a mobile radio network. The network is partitioned into a number of physical subnets wherein each physical subnet includes a certain number of network nodes in relatively close proximity to one another. Each node of each physical subnet is affiliated with a corresponding node of each of the other physical subnets, thus defining a certain number of virtual subnets. A desired communications path is routed from a source node of one physical subnet to a destination node of another physical subnet, by routing certain parts of the path within one or more physical subnets during a first transmission phase, and routing remaining parts of the path within one or more virtual subnets during a second transmission phase.

27 Claims, 12 Drawing Sheets

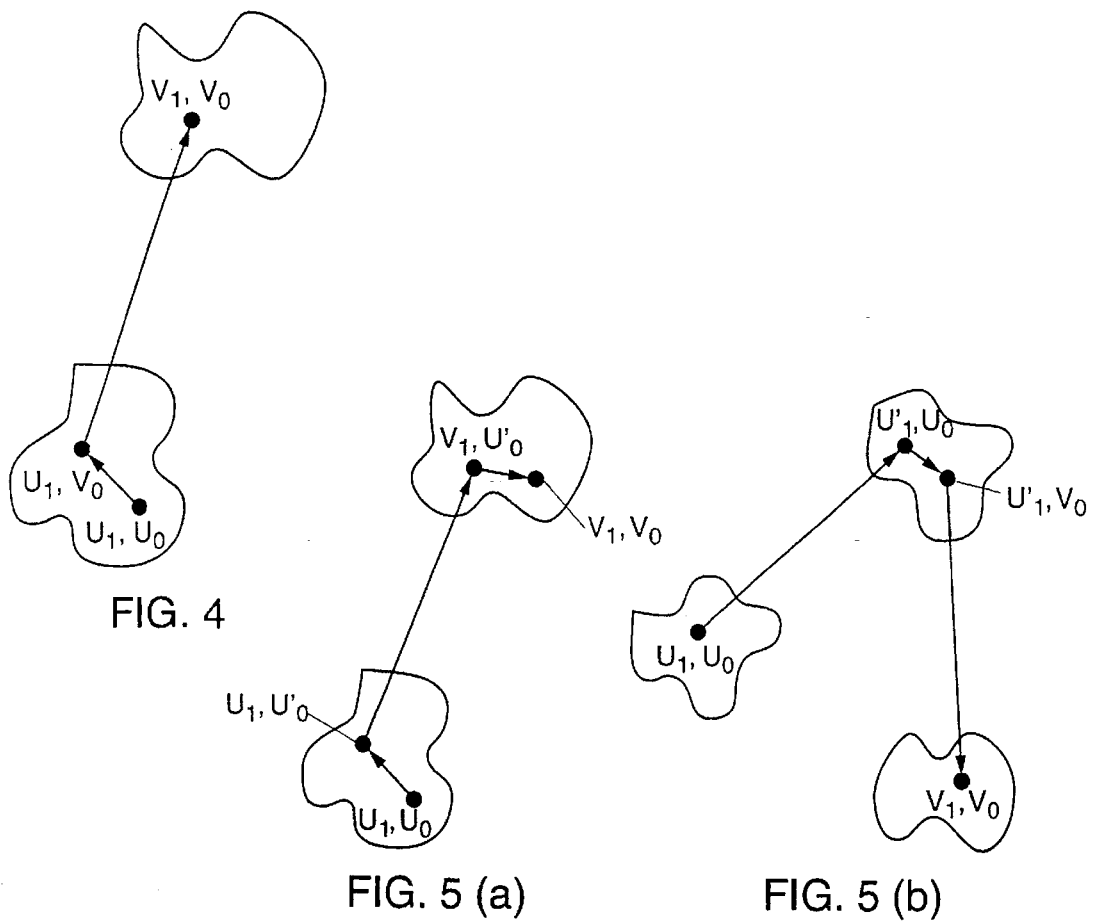
FIG. 4
FIG. 5 (a)
FIG. 5 (b)
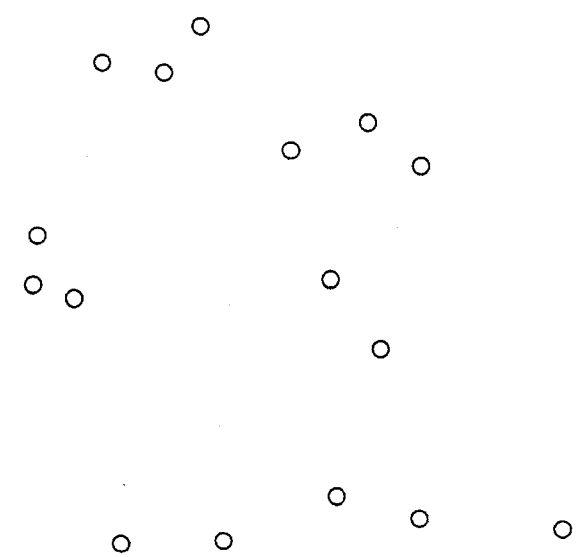
FIG. 6 there are six disjoint paths between nodes 1.3 and 3.2

1.3 ---> 1.0 ---> 3.0 ---> 3.2
1.3 ---> 1.1 ---> 3.1 ---> 3.2
1.3 ---> 1.2 ---> 3.2
1.3 ---> 0.3 ---> 0.2 ---> 3.2
1.3 ---> 2.3 ---> 2.2 ---> 3.2
1.3 ---> 3.3 ---> 3.2

ARCHITECTURE FOR MOBILE RADIO NETWORKS WITH DYNAMICALLY CHANGING TOPOLOGY USING VIRTUAL SUBNETS

BACKGROUND OF THE INVENTION

1. Field of the Invention

The present invention relates generally to communications networks having nodes which undergo dynamically changing topology, such as in mobile radio networks. Specifically, the invention pertains to an architecture and node structure in which nodes are grouped into physical or local area subnets, and each node of each physical subnet is affiliated with a corresponding node of each of the other physical subnets thus forming a number of regional virtual subnets.

2. Description of the Known Art

Mobile radio networks are expected to play an important role in future commercial and military applications, especially when a wired backbone network does not exist. Such networks are suitable when an instant infrastructure is needed and no central system administration (e.g., a cellular system base station) is available.

A peer-to-peer mobile radio network is a collection of mobile packet radio nodes that create a network on demand and without administrative support, and which nodes may communicate with each other via intermediate nodes in a multi-hop mode. Thus, every network node is also a potential router. Typical applications for peer-to-peer networks include mobile computing in remote areas, tactical communications, law enforcement operations and disaster recovery situations. A critical issue in these networks is their ability to adapt well to dynamic topology changes caused by movement of member nodes relative to other nodes of the network. Adaptation to topology changes requires changes both in channel assignment and in routing.

Mobile radio networks have existed since the 1970's. At first, these networks aimed at providing classic data services such as file transfer. Recently, there has been a growing interest in rapidly deployable and dynamically reconfigurable wireless networks, for supporting multimedia traffic including voice and video information as well as data. Several important networking issues need to be resolved for these networks to support multimedia services. Carrying real-time voice and video information imposes stringent time delay constraints on the networks. Multimedia networks must possess high performance and reliability in the nature of high throughput and fault tolerance, and low delay.

Prior work on mobile radio networks with dynamically changing topology, concentrated primarily on channel access and routing schemes in arbitrary physical topologies. See, e.g., E. M. Gafni et al., Distributed algorithms for generating loop free routes in networks with frequently changing topology, IEEE Transactions on Communications, COM-29:11-18 (1981). To improve network performance and reliability, several methods of topology control have been proposed involving adjustment of transmission ranges. See T. C. Hou et al., Transmission range control in multihop packet radio networks, IEEE Transactions on Communications, COM-34(1) (January 1986); and L. Hu, Topology control for multihop packet radio networks, IEEE Transactions on Communications, 41(10) (October 1993). More recently, a multi-cluster architecture for multi-hop mobile radio networks supporting multimedia traffic has been proposed. M. Gerla et al., Multicluster, mobile, multimedia radio networks, Wireless Networks, 1(3) (October 1995).

As far as is known, no architecture or configuration suitable for mobile radio networks has been proposed that incorporates network partitioning, and, further, is adaptable to dynamic topology changes due to node mobility.

SUMMARY OF THE INVENTION

An object of the invention is to provide a communications network architecture especially applicable to networks having nodes that are subject to dynamically changing topology, including mobile radio networks.

Another object of the invention is to provide a communications network architecture with an efficient logical topology and a suitable routing procedure, featuring high throughput and fault-tolerance, and low delay.

A further object of the invention is to provide a communications network architecture suitable for mobile radio networks in which nodes are grouped into physical and virtual subnets, and mobile nodes are able to change their subnet affiliations dynamically.

Another object of the invention is to provide a communications network architecture suitable for mobile radio networks, wherein partitioning is incorporated to enhance overall network performance and reliability.

A further object of the invention is to provide a communications network architecture that is well suited for mobile computing and multimedia applications.

According to the invention, a method of configuring a radio network having nodes that are subject to dynamically changing topology, comprises partitioning the network into a number of physical subnets wherein each physical subnet includes a certain number of network nodes in relatively close proximity to one another, and affiliating each node of each physical subnet with a corresponding node of each of the other physical subnets thereby defining a number of virtual subnets. A communications path from a source node of one physical subnet is routed to a destination node of another physical subnet, by routing certain parts of the path within one or more physical subnets during a first transmission phase, and routing remaining parts of the path within one or more virtual subnets during a second transmission phase.

According to another aspect of the invention, a node structure for a communications network wherein certain nodes of the network are subject to dynamically changing topology, comprises transmitter/receiver means for establishing parts of communications paths in the network, and processor means for controlling operations of parts of the node structure. Means are provided for partitioning the network into a number of physical subnets wherein each physical subnet includes a certain number of nodes in relatively close proximity to one another in a given local area, and for affiliating each node of each physical subnet with a corresponding node of each of the other physical subnets to define a certain number of virtual subnets, wherein the affiliated nodes of each virtual subnet form a regional network that covers the local areas of the physical subnets. Also included are means for routing a communications path from a source node from one physical subnet to a destination node of another physical subnet, including means for routing certain parts of the path within one or more physical subnets during a first transmission phase, and for routing remaining parts of the path within one or more virtual subnets during a second transmission phase.

For a better understanding of the present invention, together with other and further objects, reference is made to the following description taken in conjunction with the accompanying drawings, and the scope of the invention will be pointed out in the appended claims.

BRIEF DESCRIPTION OF THE DRAWINGS

In the drawings:

FIG. 4 depicts a shortest-path routing procedure in the network of FIG. 1;

FIGS. 5(a) and 5(b) depict Long-path routing procedures in the network of FIG. 1;

FIG. 6 shows an example of a 16-node mobile radio network;

DETAILED DESCRIPTION OF THE INVENTION

The present invention features network partitioning as a means for improving critical functions such as media access, routing, mobility management and virtual circuit set-up, while reducing signaling and control overhead. Partitioning of a mobile radio network is also used to achieve lower traffic congestion than that attainable with one large, non-partitioned network.

The present architecture is based on a specific logical topology superimposed over a physical topology, the latter being determined by the transmission coverage of each network node. The architecture selects links to be activated (logical links) out of a pool of physical links. An efficient logical topology and a suitable routing procedure, both of which result in high performance and reliability, are then determined. The architecture is especially well-suited for mobile radio networks, in that it adapts to dynamic topology changes that result from node mobility.

Figure 1:
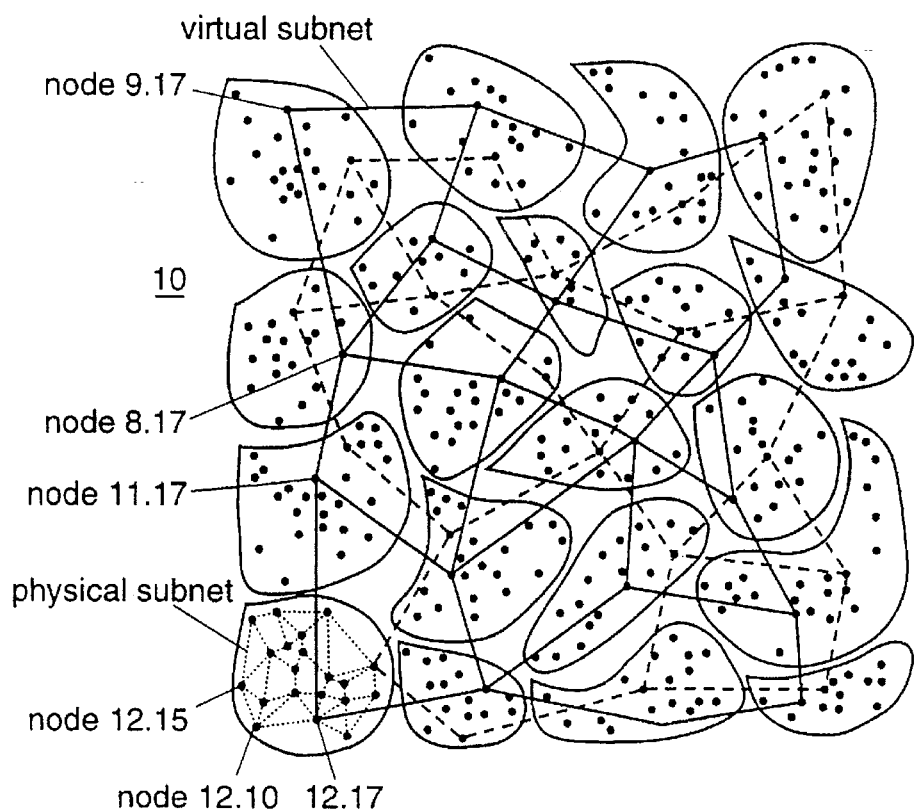
FIG. 1 illustrates a partitioned radio communications network with nodes grouped into physical and virtual subnets, according to the invention.

FIG. 1 is a diagram of a radio communications network 10 defined by an array of nodes of total number N. For purposes of illustration only, and without limiting the scope of the invention, it is assumed that some or all of the nodes are mobile relative to one another.

Figure 2:
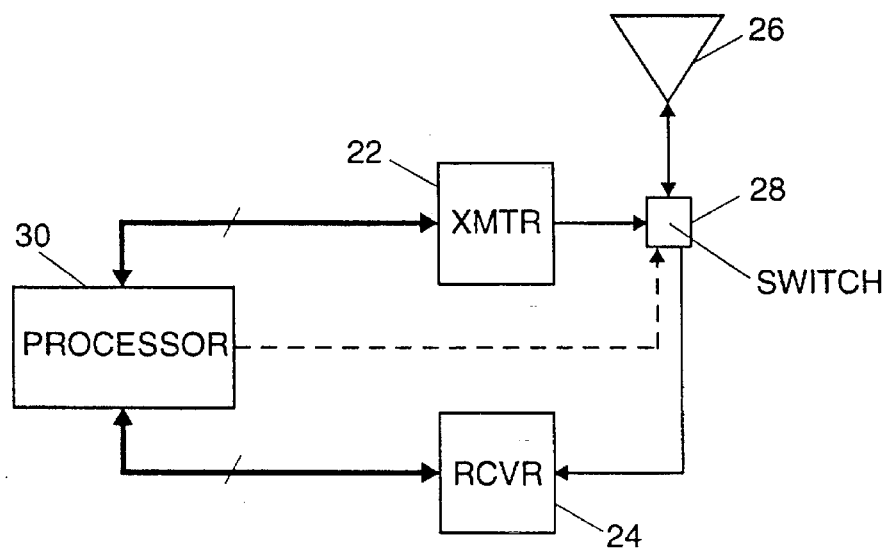
FIG. 2 is a schematic block diagram of a node of the network in FIG. 1.

It is also assumed that:

1. Each of the nodes of the network 10 has a transmitter 22 and a receiver 24. See FIG. 2; and
2. Each node has an antenna 26, and switch/interface 28 for matching and coupling the antenna 26 to the node transmitter 22 and to the receiver 24. A processor/controller 30 is associated with each node to control operations of parts of the node, including, e.g., the node's transmitter 22, receiver 24, switch 28, and other circuitry that may be a part of each node. Processor 30 typically includes working and storage memory areas, and such input/output (I/O) circuitry that is necessary to interface the processor 30 with operative parts of the node.

In the present architecture, network nodes are grouped into two types of clusters or subnets, namely, physical subnets which are individually outlined in FIG. 1, and virtual subnets that link affiliated nodes of each of the physical subnets to one another. According to the invention, the nodes can change their subnet affiliation dynamically on account of their mobility. Further, each node is allocated an address which is defined by the node's current subnet affiliation resulting from its position relative to other nodes (i.e., its physical connectivity), and address availability. Networks that have several 10s to several 1000s mobile nodes are considered in the present configuration.

A channel access protocol which resolves contentions and interference in the network, is assumed to be operative. See, e.g., I. Chlamtac et al., A link allocation protocol for mobile multihop networks, Proc. IEEE Globecom '85 (December 1985); and U.S. patent application Ser. No. 08/521,101 filed Aug. 29, 1995, and assigned to the assignee of the present invention. All relevant portions of the '101 application are incorporated by reference herein.

The present disclosure relates to a network control function that partitions a network of mobile radio nodes into physical and virtual subnets continuously according to the nodes' topological configuration. The mentioned channel access protocol and network control functions may be implemented by the processor 30 associated with each node, by programming each node processor accordingly.

The disclosure is organized as follows.

A. Addressing method.

B. Network logical topology; forming physical and virtual subnets; and location/address updating for mobile nodes (mobility management).

C. Path routing procedure.

D. Example of a 16-node network.

E. Performance issues.

A. Addressing method.

Network nodes are allocated addresses according to their present physical connectivity and address availability. Basically, each node is assigned a single address; however, in some cases a node can have more than one address as described further below.

Assume the network is initially segmented into p physical subnets, and that physical subnets cover defined local areas. Each physical subnet contains up to q mobile nodes. The pool of addresses includes an alphabet of size $m=\max(p,q)$ containing the numbers $0,1,2, \ldots m-1$. Each node in the network is given a word (address) of length two, where the least significant digit (LSD) is a digit in base-q and the most significant digit (MSD) is a digit in base-p. Therefore, the total number of words (and nodes) possible is $N=pq$.

Each node in the network topology is affiliated with other nodes whose addresses differ only in one digit. That is, node $x_1.x_0$ is affiliated with nodes $x_1.x'_0$, $0 \leq x'_0 \leq q-1$, $x'_0 \neq x_0$, and with nodes $x'_1.x_0$, $0 \leq x'_1 \leq p-1$, $x'_1 \neq x_1$. Thus, each node is affiliated with $p+q-2$ other nodes, i.e., each node has $p+q-2$ "logical neighbors". Next, we group every q nodes that differ only in their LSD into an MSD group, and every p nodes that differ only in their MSD into an LSD group. Note that there are altogether $p+q$ groups, and each node is a member of one LSD group and one MSD group. These groups are basic building blocks of the present network architecture.

B. Network logical topology.

Each node in the network is affiliated with a physical subnet (MSD group), and with a virtual subnet (LSD group). Nodes which are members of a physical subnet are within relatively close proximity to one another, in a defined local geographic area. Nodes which are members of a virtual subnet form a regional network (i.e., beyond a local area).

In one embodiment of the invention, FIG. 1 is a mobile radio network partitioned into delineated physical subnets, and having virtual subnets two of which are shown with corresponding links between their member nodes. Note that all nodes within a physical subnet have the same MSD while all nodes within a virtual subnet have the same LSD. It is assumed at first that nodes of a given physical subnet can reach nodes of neighboring physical subnets, for example, by adjusting transmission power or by using a directional antenna. Cases in which a node is disconnected from its virtual subnet, will also be considered.

A node becomes a member of a physical subnet by acquiring the first available address (with lowest LSD) in that subnet. For example, if a node joins physical subnet 12 and there are already 10 members in subnet 12, the newly joined node will use address 12.10 since LSDs 0–9 are already assigned. Once a node becomes affiliated with a specific physical subnet, it automatically becomes affiliated with a virtual subnet defined by the LSD of its address. In the above example, the newly joined node will become a member of virtual subnet 10. As long as the node remains in the vicinity of physical subnet 12, i.e., within "hearing distance" from other members of physical subnet 12, it will keep its current address.

Each node in the network is updated with the current addresses used in its physical and virtual subnets (i.e., those addresses used by the node's logical neighbors). This is accomplished, e.g., by an advertising process where each node notifies its logical neighbors of its current address using a dedicated management channel. Therefore, a node which desires to join a specific physical subnet would contact a member(s) of this physical subnet to find out which address it can acquire, and the node would then advertise its newly acquired address to all of its logical neighbors. As discussed below, if a node cannot reach any of its logical neighbors in its virtual subnet, it will use another virtual subnet via one of its logical neighbors in its physical subnet.

When a node moves to a new location where it cannot establish a connection with its previous physical subnet's members, it will drop its previous address and join a new physical subnet with whose members it can communicate, provided that addresses are available for assignment in the new subnet. If there are no available addresses in the subnet, the node would seek another subnet within hearing distance and which has available addresses. If there are no available addresses in nearby physical subnets (e.g., there are already q nodes in this subnet each using a single address, or all the addresses are used by less than q nodes with multiple addresses per node and these nodes can not release an address for the mobile node), the mobile node would receive a "guest" address x.y from a nearby physical subnet where x is the physical subnet identification number and $y \geq q$. As soon as an address becomes available in physical subnet x, the guest node will acquire the released address and drop its guest address, thus becoming a full member of physical subnet x. Nodes having guest status may nonetheless communicate with other nodes in a manner described below.

There is no direct logical connection between the virtual subnets. Because they are "overlaid" on the same region, however, they might interfere with one another. This potential interference is eliminated by the channel access scheme in use. For example, each virtual subnet may operate in a different frequency spectrum. When the number of frequency bands is less than the number of virtual subnets, some form of time sharing can be used. When a frequency band contains a single frequency channel, the subnet is operated in a pure time-division multiple access (TDMA) mode. Otherwise, a TDMA/FDMA scheme can be used to increase throughput. Note that a less acute problem exists between neighboring physical subnets which have a limited degree of overlapping because each one of them covers a limited area. Thus, one can take advantage of spatial reuse, and only neighboring or potentially overlapping physical subnets would need to use different operating frequencies.

Location (address) updating and tracking.

A mobile node once having changed its subnet affiliation will notify all the nodes in its new physical and virtual subnets (i.e., its current logical neighbors) of its newly acquired address. Such notification process can take place, e.g., when establishing links with its logical neighbors or by broadcasting in the node's physical and virtual subnets. Generally, a source node will not know the current address of a desired destination node. The source node can determine the destination address by inquiring in its present physical (or virtual) subnet, since one of the nodes there is affiliated with the destination node's virtual (or physical) subnet.

For example, let the source node S and the destination node D addresses be $S_1.S_0$ and $D_1.D_0$, respectively, and denote by $|S_1|$ the cardinality (number of members) of physical subnet $S_1$. Consider two different cases for finding node D's address. First, if $|S_1| \leq D_0$, node S would inquire in its physical subnet $S_1$ about node D and receive node D's address from node $S_1.D_0$. The latter node was earlier notified of D's current address by node D via virtual subnet $D_0$. Second, if $|S_1| < D_0$, node S would inquire in virtual subnet $S_0$ about node D and receive node D's address from node $D_1.S_0$ which is affiliated with node D's physical subnet. Note that node S does not know a priori which of the above cases is valid. Nevertheless, it inquires about node D first in node S's physical subnet, and, if it does not get a response, it inquires in its virtual subnet since at least one of node S's logical neighbors knows node D's address. Alternatively, instead of inquiring about node D's address, node S can broadcast its packets for node D in node S's physical and virtual subnets. At least one node which is a logical neighbor of node D, will then forward the packets to their destination.

Figure 3:
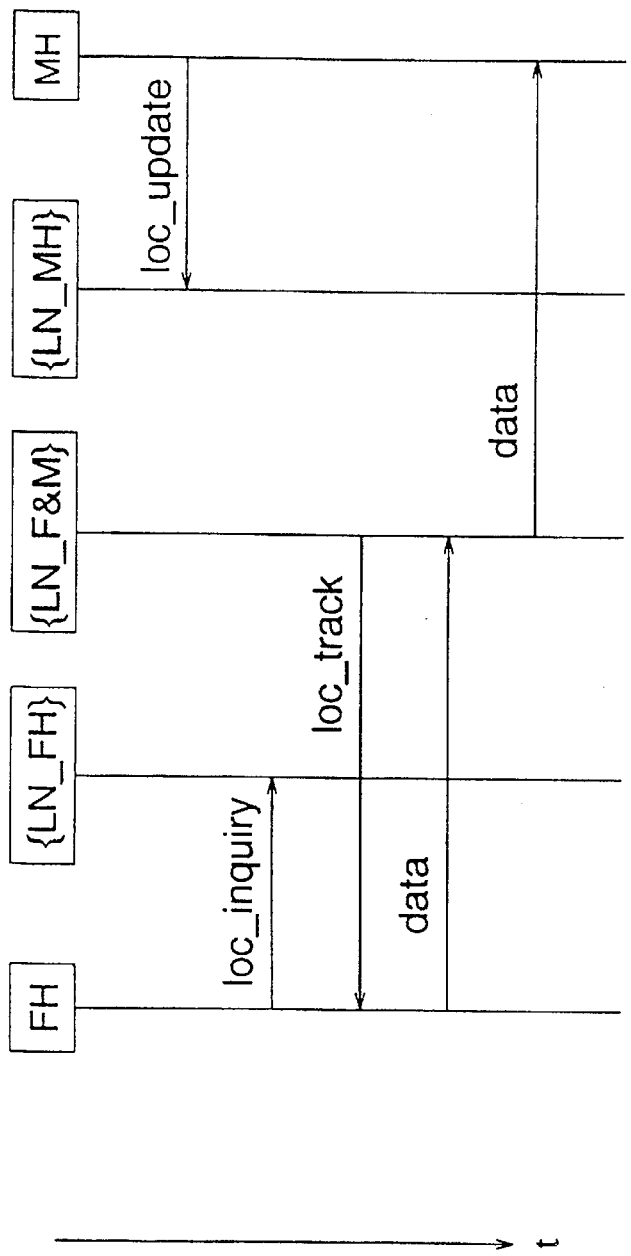
FIG. 3 illustrates a node location updating and tracking scheme according to the invention.

FIG. 3 shows an example of a location updating and tracking scheme according to the invention. After moving to a new location, a mobile host (MH) node notifies its logical neighbors by sending a location update (loc_update). A fixed host (FH) node which desires to communicate with MH, will inquire about MH by sending a location inquiry (loc_inquiry) to its logical neighbors. At least one of FH's logical neighbors is also MH's logical neighbor, so that one of their mutual logical neighbors will provide FH with MH's address by sending loc_track. After tracking down MH's address, FH sends its data to MH via one of their mutual logical neighbors.

Using a specific example in a 16-node network (p=q=4), FIG. 3 shows the nodes carrying through the above process. Note that this location updating and tracking scheme involves only p+q-2 nodes which is much less than N, and thereby results in reduced signaling and control overhead. For example, in a 400-node network with p=16 and q=25, the location updating/tracking process involves less than 10% of the nodes in the network. Therefore, in the case of multihop subnets, a flooding scheme can be used (assuming a contentionless access like TDMA/FDMA) in the corresponding physical and virtual subnets, to broadcast the loc_update and loc_inquiry messages without overloading of the entire network.

C. Path Routing Procedure

Several routing schemes are possible. A shortest path routing procedure, which is self-routing, is described. Assume first the case of one-hop physical/virtual subnets. In this procedure, routes traverse one digit at a time in fixed order, e.g., from the LSD to the MSD. Suppose the source-node address is 12.15 and the destination-node address is 9.17. The procedure uses path $12.15 \rightarrow 12.17 \rightarrow 9.17$. In general, the route from source-node address $u_1.u_0$ to destination-node address $v_1.v_0$ would traverse the path $u_1.u_0 \rightarrow u_1.v_0 \rightarrow v_1.v_0$. See FIG. 4. The length of the path equals the number of different digits in the addresses of the source and the destination nodes, i.e., at most two hopes. In the present procedure there is a unique path between any two nodes.

In general, the network is comprised of multi-hop subnets meaning that more than two hops may be necessary when routing a path from a source node to a destination node. Path routing thus is performed in two phases. In the first phase (Phase I), routing is performed only in the physical subnets (exchanging local area traffic). Here, packets are routed (e.g., using shortest path) within the physical subnet of the source node, from the source node to a node having the same LSD as the destination node, via intermediate nodes if necessary. In the second phase (Phase II), packets are routed in the virtual subnet, where packets received at the last node in the first phase are routed from this node to the destination node, via intermediate nodes if necessary, within the virtual subnet defined by the LSD of the destination node. Preferably, during Phase I, transmission power is limited to cover only the local area of the corresponding physical subnet. This allows frequency reuse due to spatial separation. In Phase II, when virtual subnets are activated, transmission coverage is adjusted (e.g., by using a directional antenna) to reach remote physical subnets.

In FIG. 1, the route from source node 12.15 to destination node 9.17, traverses the path $12.15 \rightarrow 12.10 \rightarrow 12.17 \rightarrow 11.17 \rightarrow 8.17 \rightarrow 9.17$. Two hops occur in physical subnet 12 and three hops occur in virtual subnet 17.

Note that in case a node cannot reach any of its logical neighbors in its virtual subnet (i.e., when the virtual subnet is not connected), it will have to use a different virtual subnet via one of its logical neighbors in its physical subnet. For example, assume that node A.B would like to communicate with node C.D. Using shortest path routing, the path would usually traverse in physical subnet A to node A.D, and then in virtual subnet D Go node C.D. If node A.D is not connected to virtual subnet D, however, node A.D will connect to another node (e.g., node A.E) in physical subnet A, and then in virtual subnet E to node C.E, and finally to the destination node C.D in physical subnet C as indicated in the following.

$A.B \rightarrow \ldots \rightarrow A.D \rightarrow \ldots \rightarrow A.E \rightarrow \ldots \rightarrow C.E \rightarrow \ldots \rightarrow C.D$ Alternatively, a fault-tolerant routing scheme noted below can be used to overcome such instances of disconnected subnets.

Usually, a node has a single address; however, it is possible in certain situations for a node to have more than one address. For example, suppose source node $S_1.S_0$ from a lightly populated physical subnet desires to communicate with destination node $D_1.D_0$ from a highly populated physical subnet and $|S_1|<D_0$; then source node $S_1.S_0$ will receive another address $S_1.D_0$ and will participate in virtual subnet $D_0$ in order to communicate with the destination node $D_1.D_0$. Thus, the source node is affiliated with physical subnet $S_1$, and with virtual subnets $S_0$ and $D_0$.

A guest node (with LSD greater than q) is not affiliated with any virtual subnet (there are only q such subnets). Therefore, during Phase I, a guest node communicates locally exchanging intra-subnet traffic like the other nodes in its physical subnet. During Phase II, however, a guest node is idle. When a source node wants to send a packet to a guest node outside its physical subnet, it will forward its packet via its virtual subnet to the corresponding node in the guest node's physical subnet, and the corresponding node will forward the packet to the guest node during the next phase (Phase I), i.e., via intra-subnet traffic.

Another self-routing scheme, referred to as "long-path routing" results in high fault-tolerance as discussed under the Performance heading E. below. There, the longest path between $u_1.u_0$ and $v_1.v_0$ has three hops (assuming one-hop physical/virtual subnets). FIG. 5(a) shows a physical-virtual-physical subnet route from $u_1.u_0 \rightarrow u_1.u'_0 \rightarrow v_1.u'_0 \rightarrow v_1.v_0$; where $0 \leq u'_o \leq q-1$ and $u'_o \neq u_o$. FIG. 5(b) shows a virtual-physical-virtual subnet route from $u_1.u_0 \rightarrow u'_1.u_0 \rightarrow u'_1.v_0 \rightarrow v_1.v_0$; where $0 < u'_1 < p-1$ and $u'_1 \neq u_1$.

Note that each route alternately traverses physical and virtual subnets. It can be shown that between each source-destination node pair there are p+q-2 disjoint paths, i.e., paths that do not share links or nodes (e.g., for p=q=√N the number of disjoint paths is O√N). Each of these paths corresponds to one of the p+q-2 logical neighbors of the source node. Note that a path is uniquely specified once a logical neighbor is selected by the source node. To route a packet from a source node to a destination node, the source node selects (e.g., at random) one of the p+q-2 disjoint paths. In case of a path failure, the source node can select (e.g., at random) one of the remaining disjoint paths.

D. Example of a 16-node network.

Consider the 16-node mobile radio network depicted in FIG. 6. Assume that p=q=4, i.e., there are four physical subnets, and four virtual subnets of four nodes each, where each node is a member of one physical subnet and one virtual subnet.

Figure 7:
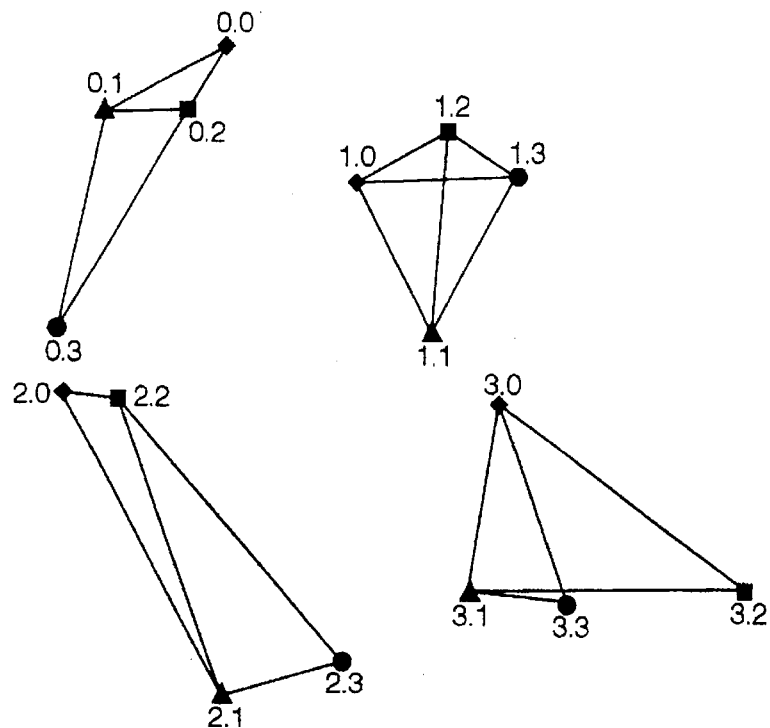
FIG. 7 shows the network of FIG. 6 with nodes linked in physical subnets according to the invention.
Figure 8:
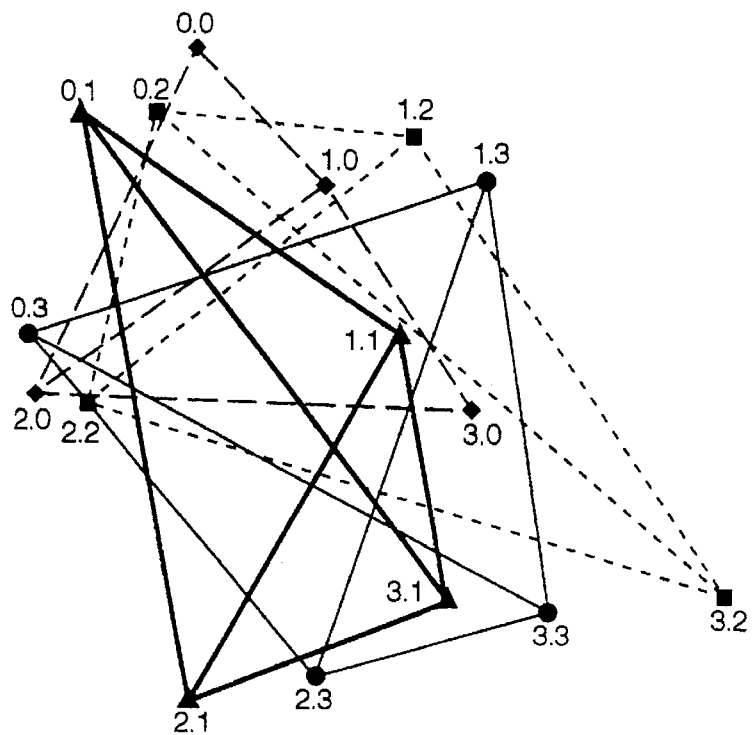
FIG. 8 shows the network of FIG. 6 with nodes linked in virtual subnets according to the invention.

FIG. 7 depicts the 16-node network of FIG. 6 with links activated during Phase I, forming four physical subnets of four member nodes each, with the node addresses. FIG. 8 depicts the same 16-node network showing links activated during Phase II, forming four virtual subnets. For visual clarity, each virtual subnet has nodes of the same key shape. Each virtual subnet contains four nodes, one from each of the four physical subnets of FIG. 7. Consider the following illustrative examples assuming shortest path routing:

1. Source-node 0.1, destination-node 3.0; the routing path is 0.1→0.0→1.0→3.0; traversing one hop in physical Subnet 0 during Phase I, and two hops in virtual Subnet 0 during Phase II; altogether three hops.

2. Source-node 1.1, destination-node 2.3, and assume node 1.3 left physical subnet 1. Since address 1.3 was dropped, source-node 1.1 will acquire an additional address—1.3— and the traversed path is of one hop in virtual subnet 3 during Phase II: 1.1, 1.3→2.3.

3. Assume that node A of address 0.0 moved to the vicinity of physical subnet 3, i.e., node A has physical connectivity with nodes that belong to physical subnet 3. Since there are no more available addresses in this subnet, node A will get a "guest" address—3.4. If the source-node is 2.0 and the destination-node is node A (3.4), the traversed path will be 2.0 →3.0→3.4, with one hop in virtual subnet 0 during Phase II, and then another hop in physical subnet 3 during Phase I.

Figure 9:
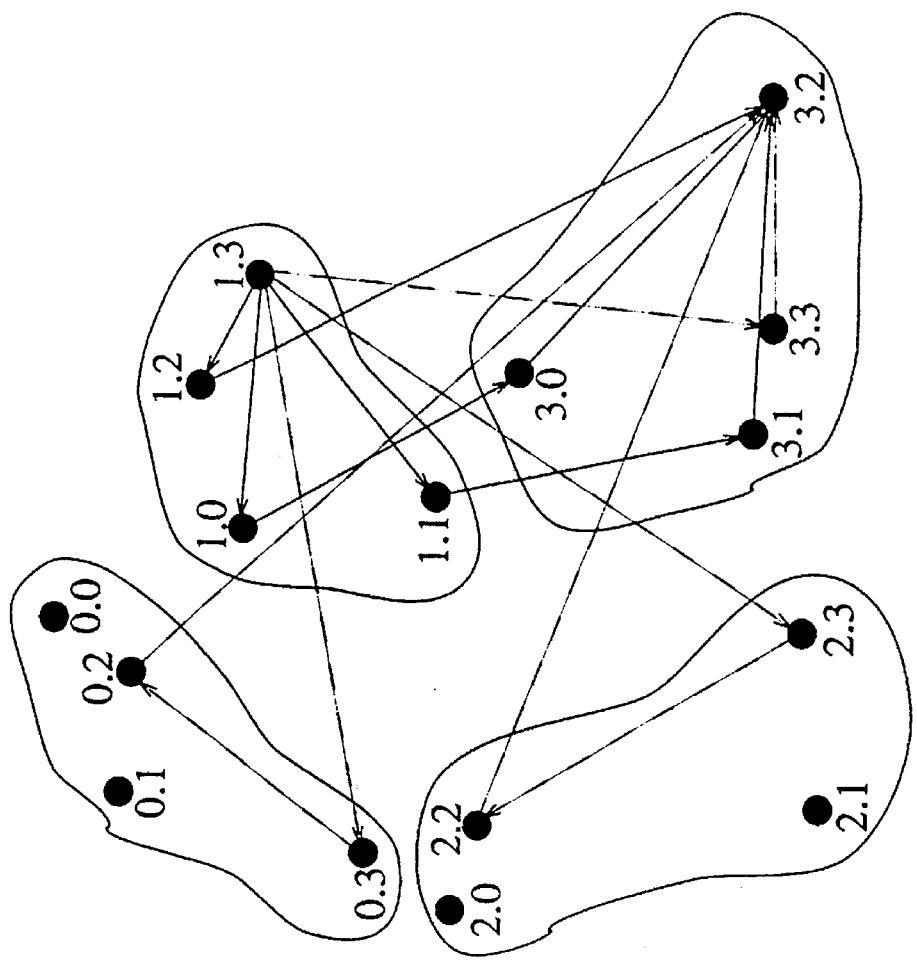
FIG. 9 shows disjoint paths using long-path routing in the network of FIG. 6.

Finally, using long-path routing in the 16-node network of FIG. 6, results in six disjoint paths (i.e., paths that do not share links or nodes) between any source-destination pair. See FIG. 9.

E. Performance issues.

Under E.1 below, network performance in terms of average number of hops, delay, throughput, and fault-tolerance is evaluated for two-hop networks, assuming one-hop physical/virtual subnets. Every subnet is also assumed to operate in a pure TDMA mode with different frequency bands assigned to potentially interfering subnets.

Under E.2, the general case of multi-hop networks (with multiple hops in each subnet), where subnets can operate in a TDMA/FDMA mode using multiple frequency channels in each subnet, is considered. The throughput of the network is evaluated and compared to that of one large multi-hop network.

It is assumed under E.1 and E.2 below that the mentioned shortest-path routing is used, i.e., any path traverses at most two subnets, one physical and one virtual.

E.1 Two-hop networks.

Average number of hops.

Each node in the network has $p+q-2$ destinations one hop away ($q-1$ and $p-1$ within its physical and virtual subnets), and $(p-1)(q-1)$ destinations two hops away (to $p-1$ nodes affiliated with each of $q-1$ virtual subnets). Thus, the average number of hops in the network is given by $$\bar{h}=[2pq-(p+q)]/(pq-1) \quad (1)$$

which is roughly equal to 2 for large networks.

Delay and throughput.

To find the delay and throughput of the network, we first derive expressions for subnet load. We define "subnet load" as the number of times a subnet is traversed by all possible $N(N-1)$ paths between source-destination pairs. It is assumed that traffic is homogeneous, where each node in the network sends $\lambda$ packets/sec to any of the other $N-1$ nodes. The total traffic passing through each physical subnet is comprised of $p\lambda$ packets/sec sent by each of the q nodes in the subnet to any of its $q-1$ peers in the subnet. Therefore, the physical subnet load is $$\eta_{ph}=N(q-1). \quad (2)$$

Similarly, the total traffic passing each virtual subnet is comprised of $q\lambda$ packets/sec sent by each of p nodes to any of its $p-1$ peers in the virtual subnet. Therefore, the virtual subnet load is $$\eta_v=N(p-1). \quad (3)$$

Thus, the maximum subnet load is $$\eta_{max}=N(\max(p,q)-1). \quad (4)$$

The average subnet load is given by $$\begin{aligned}\eta_{av} &= (p\eta_{ph}+q\eta_v)/(p+q) \quad (5)\\ &= N(2N-(p+q))/(p+q)\end{aligned}$$

In the symmetric case, where all the subnets have the same size, $p=q=\sqrt{N}$, $$\eta_{max}=\eta_{av}=N(\sqrt{N}-1) \quad (6)$$

which results in a balanced load, wherein all subnets have the same load.

For simplicity, we assume an M/M/1 queuing model to describe a single subnet behavior. Therefore, the average delay of a packet traversing subnet k is given by $\delta_k=1/(\mu C_k-\eta_k\lambda)$, where $1/\mu$ is the average packet length in bits, $C_k$ is the subnet capacity in bits/sec, and $\eta_k$ is the subnet load. If a more accurate model for the subnet behavior is used, it will only result in a different expression for $\delta_k$. Using Little's formula, the average queuing delay through the network is given by $$\delta_{av}=\frac{1}{\Lambda}\sum_{k=1}^{S}\frac{\eta_k\lambda}{\mu C_k-\eta_k\lambda} \quad (7)$$

where S and $\Lambda$ are the total number of subnets and offered traffic in the network, respectively. Note that $S=p+q$ and $\Lambda=N(N-1)\lambda$. Since we assume a single transmitter/receiver (or transceiver) per node, let $\alpha$ be the portion of the time-frame the transceiver dedicates to its physical subnet during Phase I. Assume also that there are M frequency bands, and denote by R the transmitter burst-rate in bits/sec. The capacity of physical subnet k is given by $$C_k^{ph}=\frac{\alpha R}{\tau_r},$$

where $\tau_r=\max(r/M, 1)$ and r is the number of frequency bands required to operate all the physical subnets simultaneously (using spatial reuse of frequencies at distant subnets). Note that $r \leq p$ and depends on the physical layout of the subnets. Similarly, the capacity of virtual subnet k is given by $$C_k^v=\frac{(1-\alpha)R}{\tau_q},$$

where $\tau_q=\max(q/M, 1)$. Note that q frequency bands are required to operate the virtual subnets simultaneously, since they overlap. Using equation (7) above, the average queuing delay across the network is given by $$\delta_{av}=\frac{1}{N(N-1)}\left(\sum_{k=1}^{p}\frac{N(q-1)}{\frac{\alpha\mu R}{\tau_r}-N(q-1)\lambda}+\sum_{i=1}^{q}\frac{N(p-1)}{\frac{(1-\alpha)\mu R}{\tau_q}-N(p-1)\lambda}\right) \quad (8)$$

or

-continued $$\delta_{av} = \quad (9)$$

$$\frac{1}{N-1}\left(\frac{p(q-1)}{\frac{\alpha\mu R}{\tau_r}-N(q-1)\lambda}+\frac{q(p-1)}{\frac{(1-\alpha)\mu R}{\tau_q}-N(p-1)\lambda}\right)$$

where $$0 \leq \lambda \leq \min\left(\frac{\alpha\mu R}{N(q-1)\tau_r}, \frac{(1-\alpha)\mu R}{N(p-1)\tau_q}\right) \quad (10)$$

That is, the load cannot exceed the subnet capacity. The maximum value of $\lambda$ is achieved for $\alpha_{opt}$ satisfying $$\frac{\alpha\mu R}{N(q-1)\tau_r} = \frac{(1-\alpha)\mu R}{N(p-1)\tau_q} \quad (11)$$

Solving equation (11) for $\alpha$ yields $$\alpha_{opt} = \frac{(q-1)\tau_r}{(q-1)\tau_r + (p-1)\tau_q} \quad (12)$$

Substituting the value of $\alpha_{opt}$ in one of the sides of eq. (11), $$\lambda_{max} = \frac{\mu R}{N(q-1)\tau_r + N(p-1)\tau_q} \quad (13)$$

Using eqs. (12) and (13) in eq. (9), and after some arrangements, one obtains $$\mu R\delta_{av} = \frac{\mu R(p+q)}{N(N-1)\lambda_{max}} \cdot \frac{1}{1-\frac{\lambda}{\lambda_{max}}} \quad (14)$$

The normalized (to burst-rate) user throughput is given by $$\gamma = (N-1)\frac{\lambda_{max}}{\mu R} \quad (15)$$

and the normalized network throughput is given by $$\Gamma = N\gamma \quad (16)$$

Substituting eqs. (13) and (15) into eq. (16), $$\Gamma = \frac{N-1}{\tau_q(p-1)+\tau_r(q-1)} \quad (17)$$

Using eqs. (15) and (16), eq. (14) becomes $$\mu R\delta_{av} = \frac{p+q}{\Gamma} \cdot \frac{1}{1-\rho} \quad (18)$$

where $p \equiv \lambda/\lambda_{max}$ is the normalized (user/network) offered load. Note that the left side of eq. (14) is the average packet queuing delay across the network in units of packet transmission time.

Also, note that when $1 \leq M \leq \min(r,q)$ the throughput is linear with the number of frequency bands M, i.e., adding more frequency bands will increase the throughput linearly. Increasing M beyond $\min(r,q)$ will still increase the throughput in a sub-linear relation until a maximum is reached for $M=\max(r,q)$.

$$\Gamma_{max} = \frac{N-1}{p+q-2} \quad (19)$$

with a global maximum of $\Gamma_{max}=(\sqrt{N}+1)/2$ for $p=q=\sqrt{N}$. This means that for a network of size N and subnets of size $\sqrt{N}$, $\sqrt{N}$ frequencies are required to achieve maximum throughput.

Figure 10:
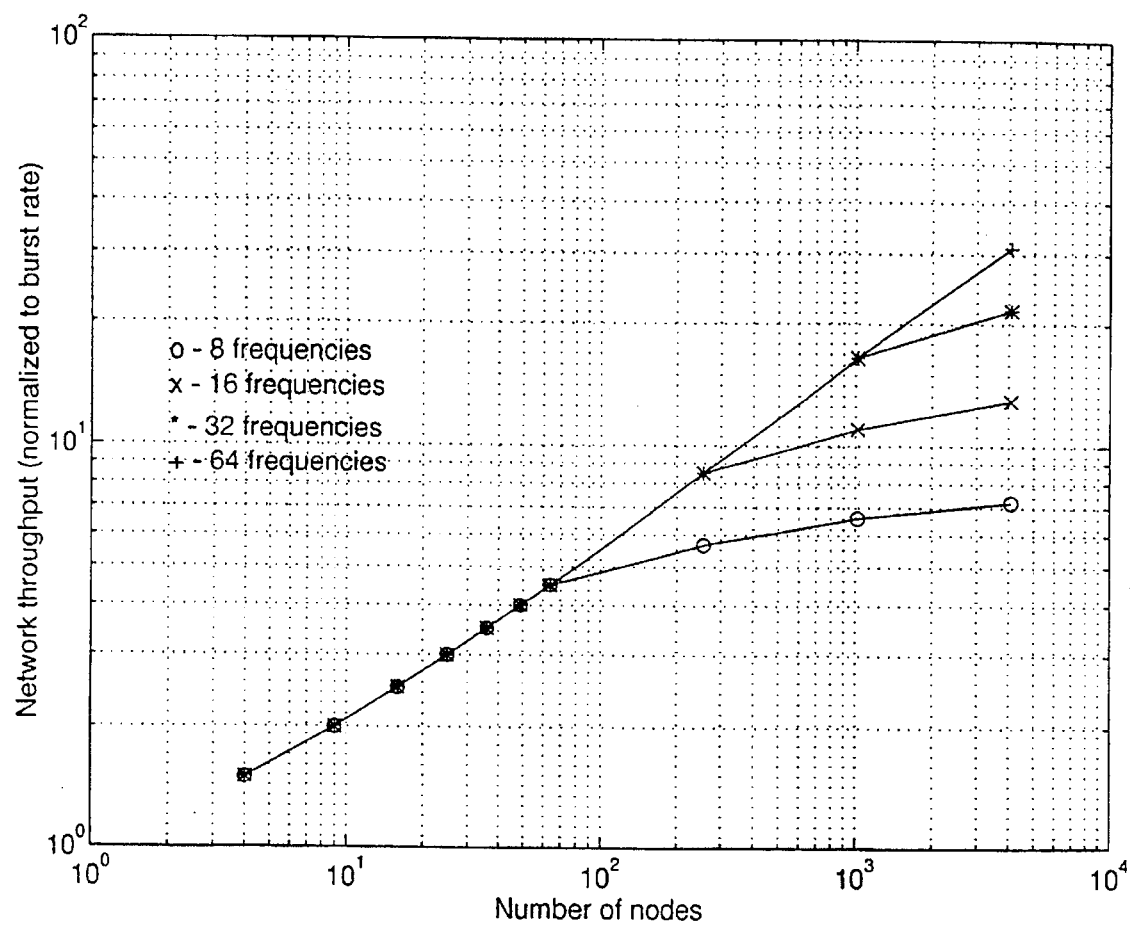
FIG. 10(a) is a graph depicting a normalized throughput of different size networks for different numbers of available frequencies, according to the invention.
FIG. 10(b) is a graph depicting an effect of subnet size on network throughput.
Figure 10:
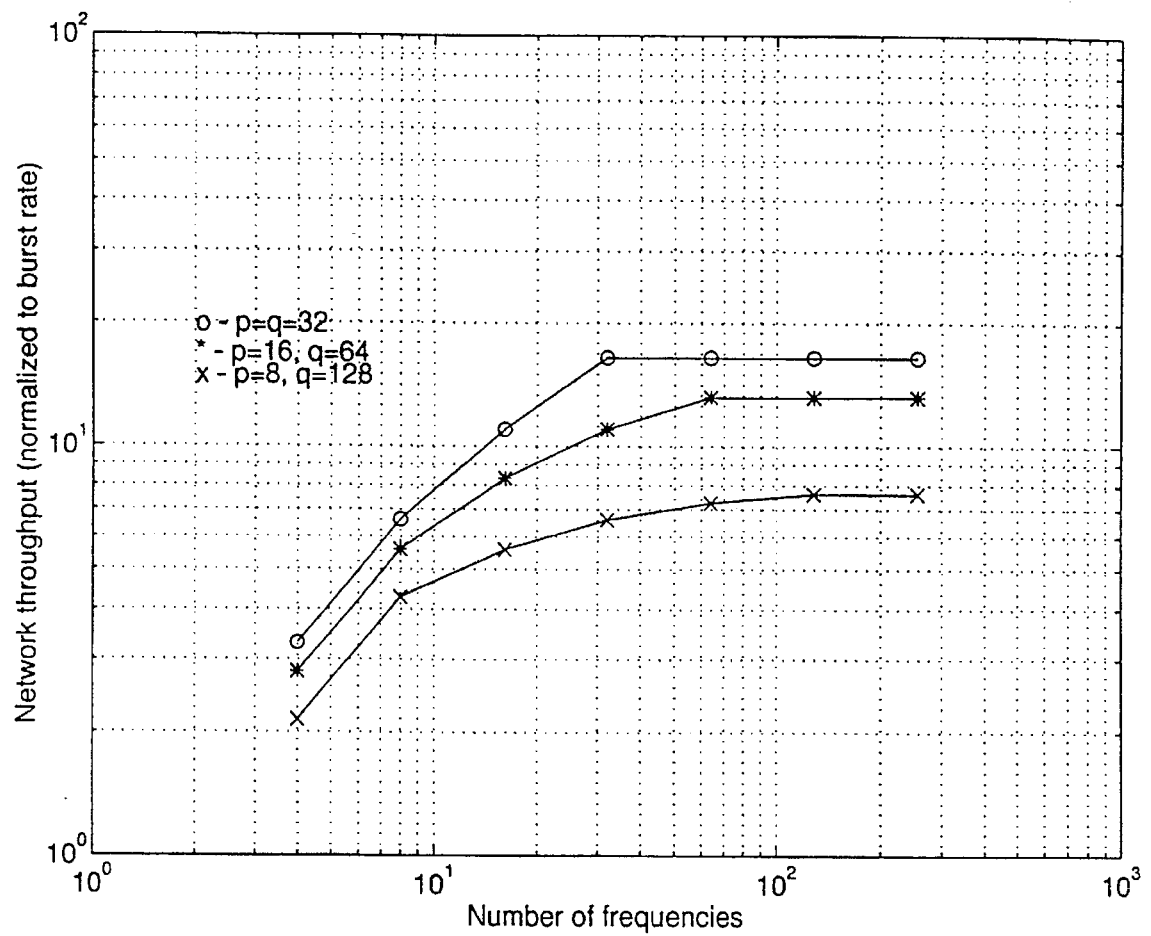

FIG. 10(a) depicts the normalized throughput of different size networks for different numbers of available frequencies assuming that $p=q=\sqrt{N}$ and $r=8$, i.e., eight frequencies are necessary and sufficient for simultaneous operation of all the physical subnets.

FIG. 10(b) depicts the effect of subnet size on network throughput. In accordance with equation (19), higher throughput is expected when p+q decreases till its minimum value of $2\sqrt{N}$ for $p=q=\sqrt{N}$. Thus, better throughput performance is achieved when the physical subnet size is closer to the virtual subnet size, with the best performance achieved for identical sizes. This is because for $p=q=\sqrt{N}$, the average subnet load is equal to the maximum subnet load (see eq. (6)). This means that for any other routing scheme $\eta_{max} \leq N$ ($\sqrt{N}-1$). Therefore, the current routing procedure achieves maximum throughput and minimum delay for all loads from zero till the maximum throughput is achieved.

Figure 11:
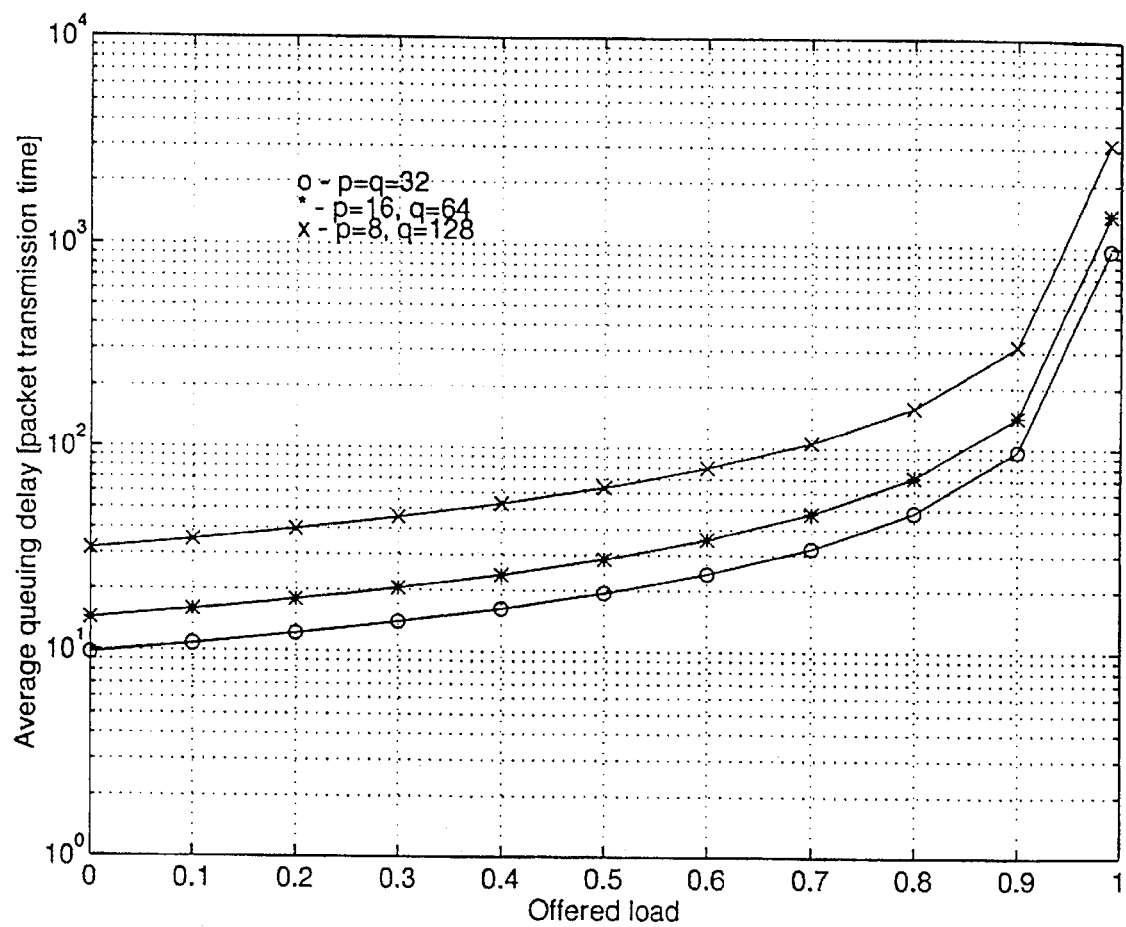
FIG. 11(a) is a graph depicting average queuing delay as a function of offered load with different size subnets.
FIG. 11(b) is a graph depicting average queuing delay as a function of offered load for different values of available frequencies.
Figure 11:
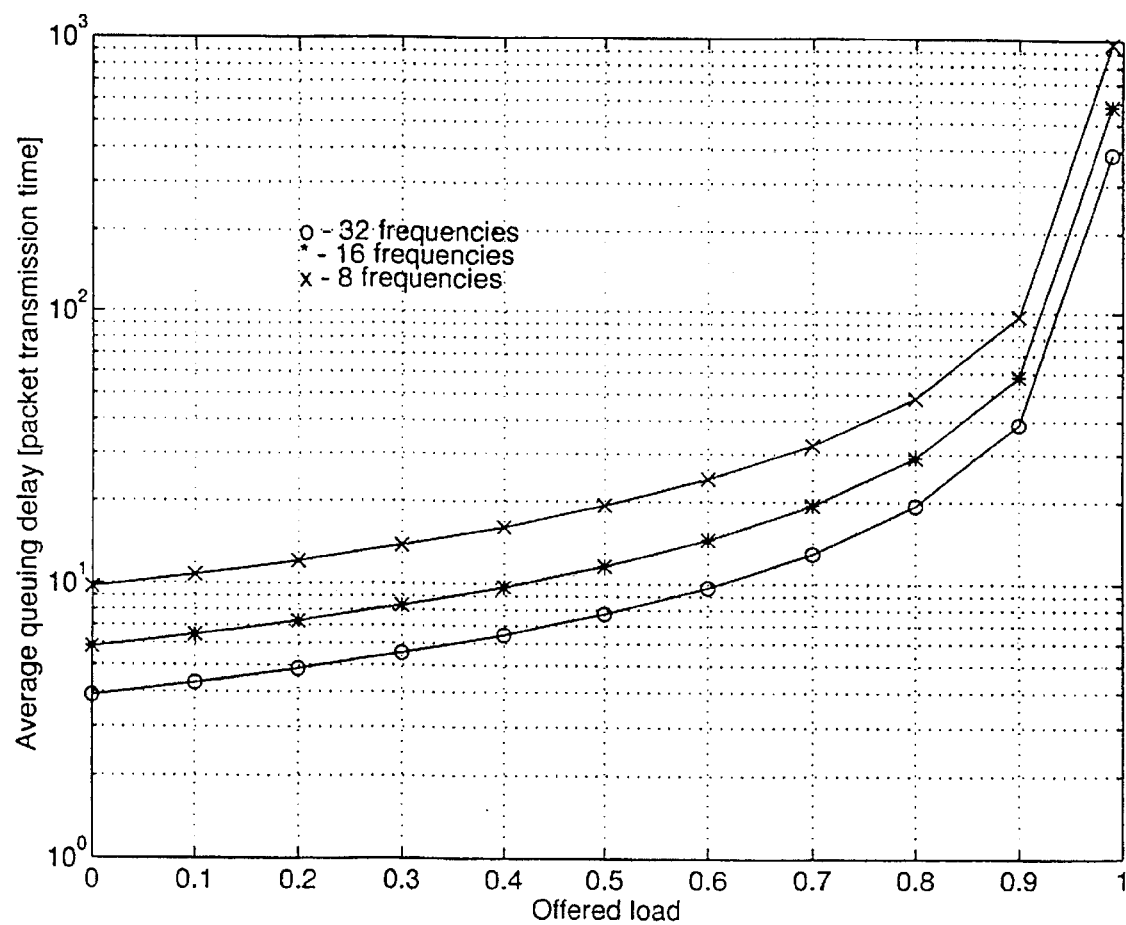
Figure 12:
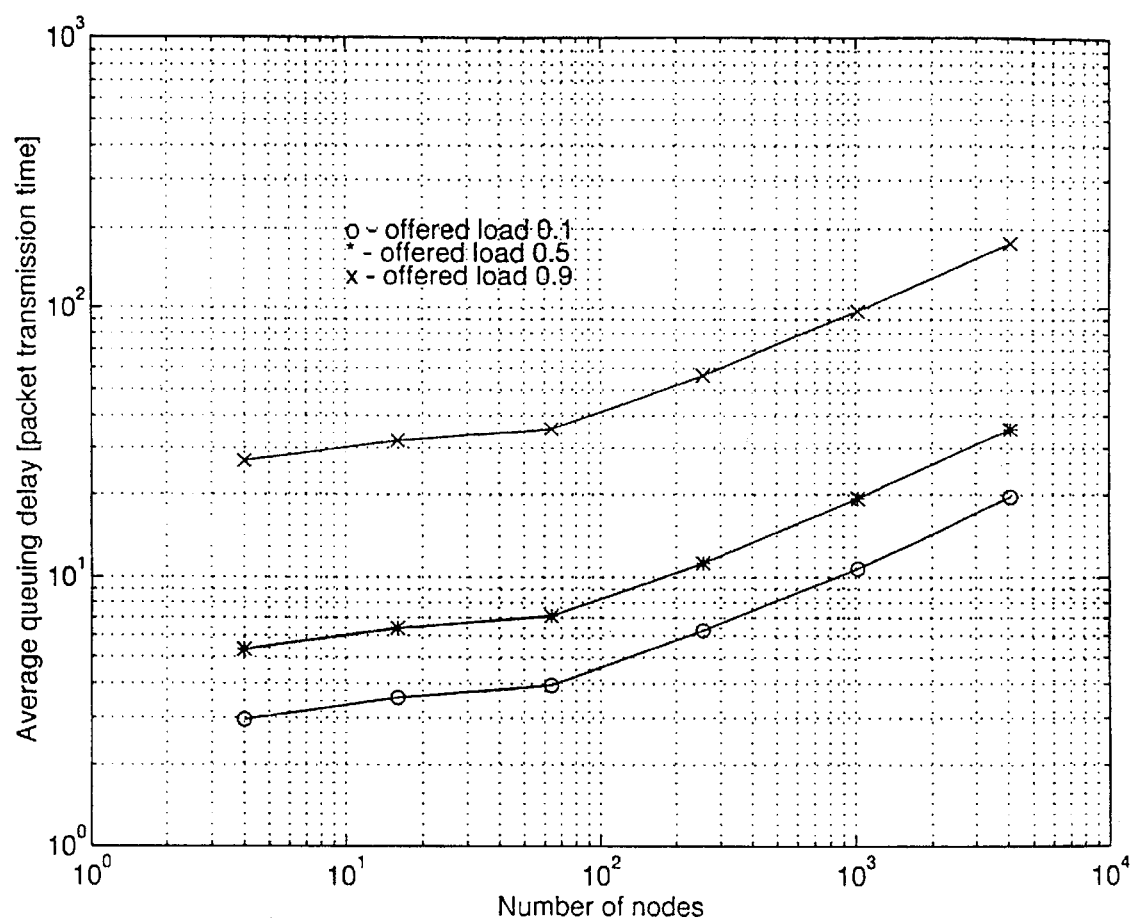
FIG. 12 is a graph depicting average queuing delay as a function of number of nodes for different values of offered load.

FIG. 11(a) depicts the average end-to-end packet queuing delay versus user/network offered load for a 1024-node network with different size subnets. It is assumed that $M=r=8$. In FIG. 11(b), the dependency of the average delay on the offered load for a 1024-node network is depicted for different values of available frequencies. It is assumed that all subnets have the same size (p=q=32) and r=8. FIG. 12 depicts the average delay vs. network size (number of nodes) for different values of offered load, assuming that $p=q=\sqrt{N}$; M=8; and r=8.

Fault-tolerance.

To evaluate the fault-tolerance of the present architecture, we use two metrics, viz., "node-connectivity" and "link-connectivity". Define node-connectivity—$\kappa$ as the minimum number of faulty nodes that creates a disconnected network. Since each node in the logical topology is connected directly to p+q−2 other nodes, the node-connectivity of the network is $\kappa=p+q-2$. For example, consider a 1024-node network comprised of 32 subnets of 32 nodes each, then any 61 nodes can be faulty before the network becomes disconnected.

Define the network link-connectivity—$\sigma$ as the minimum number of node-disjoint paths between any source-destination pair (i.e., paths that do not share links or pass through the same node). The link-connectivity of the topology is $\pi=2$ for path-lengths of not more than two hops. If we allow path-lengths to be up to three hops (using long-path routing, see FIGS. 5(a) and 5(b)), it can be shown that the link-connectivity reaches its maximum value of $\pi=p+q-2$. Referring to the above example, there are at least 62 node-disjoint paths, i.e., alternative paths between any source-destination pair with path-lengths of at most three hops. Since the network has high node-connectivity and high link-connectivity, it is therefore very reliable. The present network architecture is thus well suited for wireless asynchronous transfer mode (ATM) communications, where a virtual path established between a given source-destination pair will have many alternative disjoint routes that can be used in case of node or link failures due to mobility, interference and the like.

E.2 Multi-hop Networks.

In general, the subnets are not fully connected and multiple hops may be necessary within each physical or virtual subnet. We assume that in each subnet a link-activation TDMA/FDMA (multiple frequency channels per subnet are possible) scheme is used where each link is activated at least once during each time frame. The analysis that follows is true for any routing procedure within the multi-hop subnets.

Throughput.

In the following analysis these additional notations are used:

T—number of time-slots used in one large multi-hop network.

$T_1$—number of time-slots used in Phase I.

$T_2$—number of time-slots used in Phase II.

L—total number of links activated in one large multi-hop network.

$L_1$—total number of links activated in the physical subnets during Phase I.

$L_2$—total number of links activated in the virtual subnets during Phase II.

$\eta^i$—load of link i in one large multi-hop network, i.e., the number of times link i is traversed by all possible N(N-1) paths in the network.

$\eta^j_1$—load of link j in its physical subnet, i.e., the number of times link j is traversed by all possible q(q-1) paths in its physical subnet.

$\eta^k_2$—load of link k in its virtual subnet, i.e., the number of times link k is traversed by all possible p(p-1) paths in its virtual subnet.

$\eta$—maximum link-load in one large multi hop network (i.e., $\max_i(\eta^i)$).

$\eta_1$—maximum link-load during Phase I (i.e., $\max_j(\eta^j_1)$).

$\eta_2$—maximum link-load during Phase II (i.e., $\max_k(\eta^k_2)$).

Again assume homogeneous traffic and an M/M/1 queueing model to describe the behavior of each activated link. Using Little's formula and summing over all the activated links in the network, the average queueing delay across the network is given by $$\delta_{av} = \frac{1}{N(N-1)} \left( \sum_{j=1}^{L_1} \frac{p\eta_1^j}{\frac{\alpha\mu R}{T_1} - p\eta_1^j \lambda} + \sum_{k=1}^{L_2} \frac{q\eta_2^k}{\frac{(1-\alpha)\mu R}{T_2} - q\eta_2^k \lambda} \right) \quad (20)$$

Note that the capacity of the links is inversely proportional to the number of time slots (in the corresponding phase) which depends on the number of frequency channels used. The maximum traffic between any two nodes during phase I is $\lambda_1 = \alpha\mu R/(T_1\eta_1 p)$. Similarly, the maximum traffic between any two nodes during phase II is $\lambda_2 = (1-\alpha)\mu R/(T_2\eta_2 q)$. To find the optimal value of $\alpha$ we solve $\lambda_1 = \lambda_2$ and find that $$\alpha_{opt} = \frac{T_1\eta_1 p}{T_1\eta_1 p + T_2\eta_2 q} \quad (21)$$

Therefore, the maximum traffic between any two nodes in the network is $$\lambda_{max} = \frac{\mu R}{T_1\eta_1 p + T_2\eta_2 q} \quad (22)$$

The normalized (to burst rate) network throughput is given by $$\Gamma = N(N-1)\frac{\lambda_{max}}{\mu R} = \frac{N(N-1)}{T_1\eta_1 p + T_2\eta_2 q} \quad (23)$$

Note that $\eta_1$ and $\eta_2$ depend on the logical topology and the routing procedure used within the subnets.

Equation (17) can be derived as a special case (a two-hop network) from equation (23) by substituting $T_1 = q(q-1)\tau_r$, $T_2 = p(p-1)\tau_q$ and $\eta_1 = \eta_2 = 1$. Note that q(q-1) and p(p-1) are the number of links in one-hop fully connected physical and virtual subnets operated in a pure TDMA mode, respectively.

The performance (e.g., throughput) of the present architecture and that of a single large multi-hop radio network are now compared. First, the throughput for one large multi-hop network is calculated. The queueing delay across one large multihop network is given by $$\delta'_{av} = \frac{1}{N(N-1)} \sum_{i=1}^{L} \frac{\eta^i}{\frac{\mu R}{T} - \eta^i \lambda} \quad (24)$$

Thus, the throughput of one large multi-hop network is given by $$\Gamma'_{max} = \frac{N(N-1)}{T\eta} \quad (25)$$

The throughput values for the present architecture (eq. (23)) and for one large multi-hop network (eq. (25)) depend strongly on the physical and logical topologies, routing procedure and the number of frequencies. It was observed that, especially in large networks with random topology (a characteristic of ad-hoc sporadic networks), the maximum link traffic-load in one large network is significantly higher than the maximum link traffic-load in the subnets, i.e., $\eta \gg p\eta_1, q\eta_2$. Therefore, partitioning of the network may reduce congestion and improve network performance, with higher throughput and lower delay.

Note that there is a penalty associated with large transmission radii resulting in reduced link capacities, because more time-slots are needed. Because link loading may be significantly reduced, however, the total effect may result in increased throughput. Also, while one large multi-hop network cannot take advantage of many frequencies (if available) because of spatial reuse, the present architecture can use multiple frequencies to separate overlaid virtual subnets. This also results in increased throughput.

Figure 13:
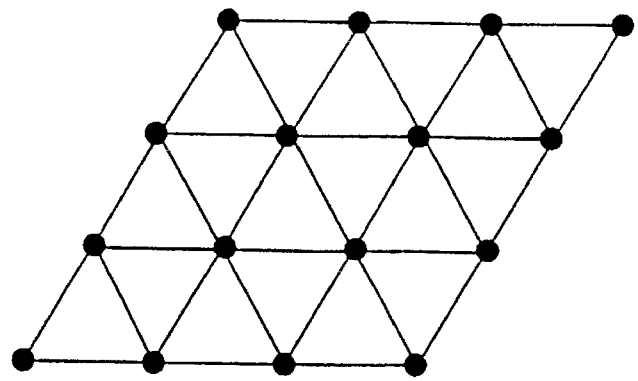
FIG. 13 is an example of a 16-node network with a controlled topology.
Figure 14:
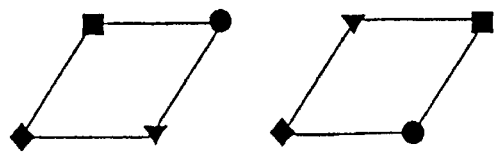
FIG. 14 depicts links activated in physical subnets in the network of FIG. 13.
Figure 14:
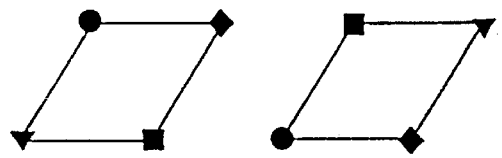
Figure 15:
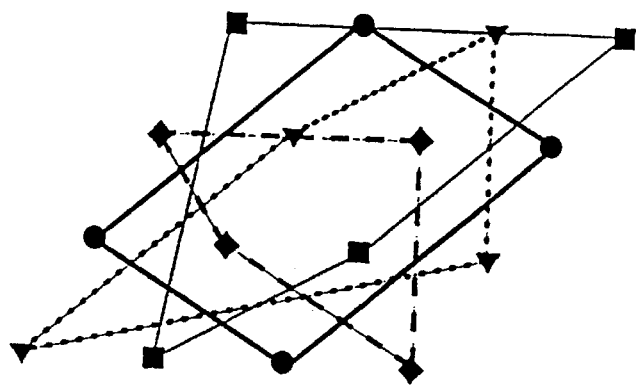
FIG. 15 depicts links activated in virtual subnets in the network of FIG. 13.

The following 16-node network example illustrates the strength of the proposed architecture. FIG. 13 depicts a network with a well controlled topology of maximum degree six, defined by equilateral triangles. According to the present architecture, the network can be partitioned into four physical and four virtual subnets (p=q=4). FIGS. 14 and 15 show the links activated during the physical and virtual subnet transmission phases, respectively.

Using shortest-path routing, and a TDMA/FDMA link-activation assignment described, e.g., in Appendix A below, the values needed to calculate throughput performance according to the number of available frequencies are determined as shown in Table 1.

TABLE 1

| Number of frequencies | T | $\eta$ | $T_1$ | $T_2$ | $\eta_1$ | $\eta_2$ |
| --- | --- | --- | --- | --- | --- | --- |
| 1 | 22 | 16 | 8 | 32 | 2 | 2 |
| 2 | 14 | 16 | 4 | 16 | 2 | 2 |
| 3 | 12 | 16 | 4 | 11 | 2 | 2 |
| 4 | 12 | 16 | 4 | 8 | 2 | 2 |
| 8 | 12 | 16 | 4 | 4 | 2 | 2 |

Figure 16:
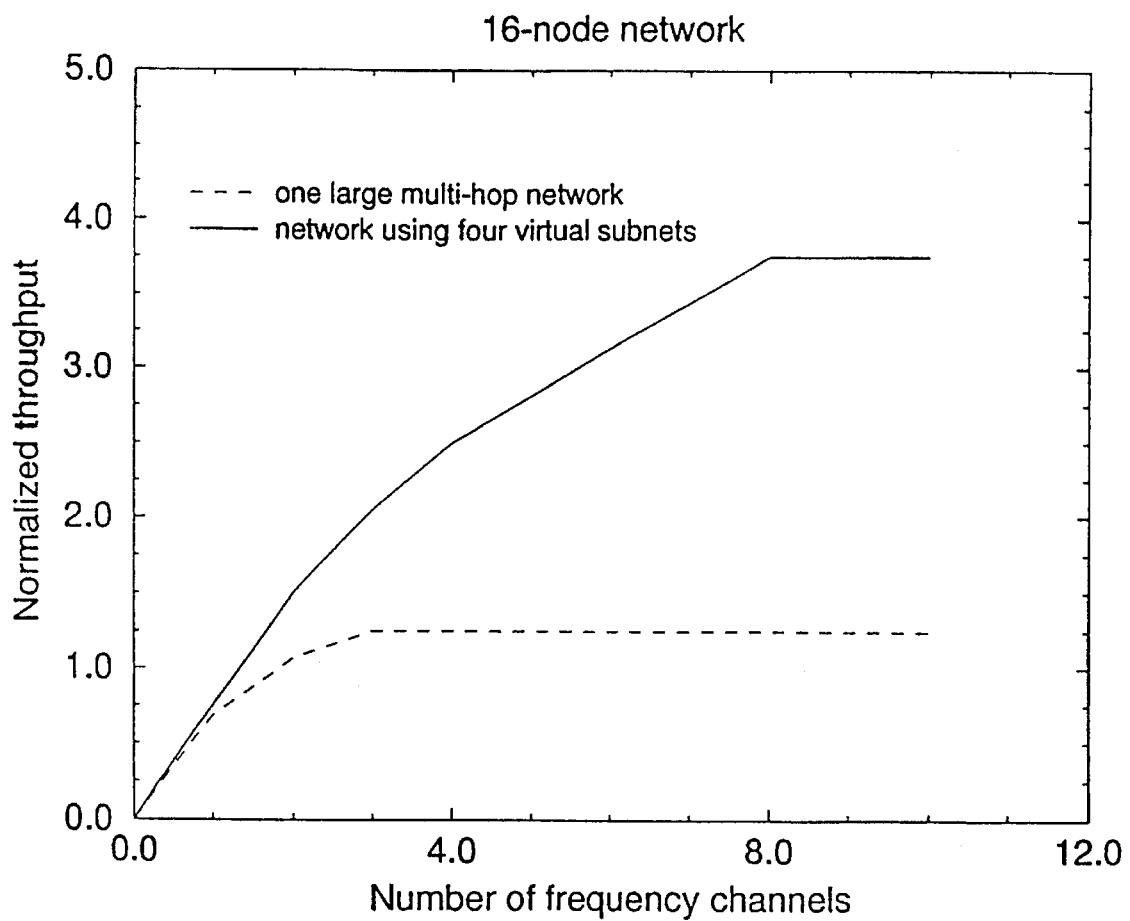
FIG. 16 is a graph comparing throughput performance of one large multi-hop network, with that of a network using four virtual subnets according to the invention.

The throughput performance for one large multi-hop network and for a network using four virtual subnets is depicted in FIG. 16. For this particular example, it can be seen that for a given number of frequencies the present architecture always has better throughput performance than one large multi-hop network. Note that not more than three frequencies are used to achieve the maximum throughput of the one large network, i.e., adding more frequencies does not increase the throughput. This is because of the limited transmission range of the nodes, taking advantage of spatial reuse.

With the present network architecture, however, it is possible to increase throughput further by adding more (up to eight) frequencies. Observe that the average and maximum link loading in the one large multi-hop network is 8.33 and 16, respectively; while for a network using four virtual subnets according to the invention, the corresponding values are identical—8.0, i.e., the network has a balanced load. The average and maximum number of hops in the one large network are 2.29 and 6.0, respectively, while for the network using four virtual subnets the corresponding values are 2.13 and 4.0.

In summary, the present architecture comprises a logical topology of physical and virtual subnets, and corresponding addressing, mobility management and routing schemes. The architecture is especially applicable to mobile radio networks and accommodates dynamic topology changes due to relative movement of network nodes. The architecture partitions a mobile radio network into logically independent subnetworks. Network nodes are members of physical and virtual subnets and may change their affiliations with these subnets due to their mobility. Each node is allocated an address based on a current subnet affiliation. Especially in large networks with random topology, it was observed that partitioning of the network may result in a substantially more balanced load than in one large multi-hop network, an attribute that can improve the network's performance significantly. The architecture is highly fault-tolerant and can handle a relatively simple location updating and tracking scheme. By virtue of its load balancing feature, the architecture typically achieves a network with relatively high throughput and low delay.

Appendix A—A Distributed Link Activation Scheme

The following is a distributed on-line TDMA/FDMA link-activation scheme for assigning a directed link between two nodes (e.g., node i and node j). It is assumed that nodes i and j have knowledge of existing assignments at their neighboring nodes (i.e., nodes within "hearing" distance). The output of the assignment process is an assignment of link i→j, i.e., an ordered pair of a time-slot and a frequency—(t, f) or a time-slot—t when only one frequency is available (pure TDMA). The following notations are used:

T—set of available time-slots.

F—set of available frequencies.

$T_r$—set of time-slots in use by node r.

$F^{in}_{r,h}$—set of frequencies in use by links incoming to nodes neighboring node r at time-slot $t_h$.

$F^{out}_{r,h}$—set of frequencies in use by links outgoing from nodes neighboring node r at time-slot $t_h$.

The sets T and F are ordered arbitrarily at the outset.

Node Assignment Scheme

1. Choose $t_k \in T-(T_i \cup T_j)$, where k is the least order number; if no time-slot is available go to step 4;

2. Choose $f_1 \in F-(F^{in}_{i,k} \cup F^{out}_{j,k})$, where l is the least order number; if no frequency is available, $T \leftarrow T-\{t_k\}$ and go to step 1;

3. Stop, the pair $(t_k, f_1)$ is the i→j link assignment.

4. Stop, link i→j cannot be assigned.

Note that a time-slot assignment involves only logical links, while a frequency assignment considers both logical and physical links.

While the foregoing description represents a preferred embodiment of the invention, it will be obvious to those skilled in the art that various changes and modifications may be made, without departing from the true spirit and scope of the invention which is defined by the following claims.

I claim:

1. A method of configuring a radio network having nodes that are subject to dynamically changing topology, comprising;
   partitioning a radio network into a number of physical subnets wherein each physical subnet includes a certain number of network nodes in relatively close proximity to one another;
   affiliating each node of each physical subnet with a corresponding node of each of the other physical subnets thus defining a certain number of virtual subnets; and
   routing a communications path from a source node of one physical subnet to a destination node of another physical subnet, by routing certain parts of said path within one or more physical subnets during a first transmission phase, and routing remaining parts of said path within one or more virtual subnets during a second transmission phase.

2. The method of claim 1, including alternating the first transmission phase and the second transmission phase with one another.

3. The method of claim 1, including setting transmission power of nodes forming parts of said communications path to cover a geographic area that substantially corresponds to their physical subnets during said first transmission phase.

4. The method of claim 1, including defining a unique address for each network node by identifying a physical and a virtual subnet with which the node is affiliated, in said address.

5. The method of claim 1, including setting the number of physical subnets of the radio network substantially equal to the number of nodes in each of the physical subnets.

6. The method of claim 1, wherein said routing step is performed by identifying a physical subnet with which either a source or a destination node is affiliated, and routing a part of the communications path within the identified physical subnet during said first transmission phase.

7. The method of claim 1, wherein said routing step is performed by identifying a virtual subnet with which either a source or a destination node is affiliated, and routing a part of the communications path through the identified virtual subnet during said second transmission phase.

8. The method of claim 1, wherein said routing step is performed by defining a shortest path that traverses at most a physical subnet and a virtual subnet.

9. The method of claim 1, wherein said routing step is performed by defining a long path that traverses at most three different subnets in an order of either physical-virtual-physical, or virtual-physical-virtual.

10. The method of claim 4, including enabling a mobile node from a first physical subnet to join a second physical subnet, by assigning an address to the mobile node identifying the second physical subnet when the mobile node is in the area of the second physical subnet.

11. The method of claim 10, including affiliating the mobile node with a virtual subnet that is available for a node entering the second physical subnet, and identifying the available virtual subnet in the address assigned to the mobile node.

12. The method of claim 4, including updating a network node with addresses currently in use by other nodes in physical and virtual subnets in common with said network node.

13. The method of claim 12, wherein said updating step includes advertising the other nodes' current addresses to their logical neighboring nodes.

14. The method of claim 10, including assigning a guest address to a mobile node in the area of the second physical subnet when no virtual subnet is available for affiliation with the mobile node, and enabling the mobile node to be part of a communications path only during said first transmission phase.

15. A node structure for a communications network wherein certain nodes of the network are subject to dynamically changing topology, said node structure comprising;

transmitter/receiver means for establishing parts of communications paths in the network, and processor means for controlling operations of parts of the node structure;

wherein said processor means includes:

means for partitioning the network into a number of physical subnets wherein each physical subnet includes a certain number of network nodes in relatively close proximity to one another;

means for affiliating each node of each physical subnet with a corresponding node of each of the other physical subnets to define a certain number of virtual subnets; and means for routing a communications path from a source node of one physical subnet to a destination node of another physical subnet, including means for routing certain parts of said path within one or more physical subnets during a first transmission phase, and for routing remaining parts of said path within one or more virtual subnets during a second transmission phase.

16. The node structure of claim 15, wherein said processor means includes means for alternating the first transmission phase and the second transmission phase with one another.

17. The node structure of claim 15, wherein said transmitter/receiver means and said processor means are arranged to set transmission power of nodes forming parts of the communications path to cover a geographic area that substantially corresponds to their physical subnets during said first transmission phase.

18. The node structure of claim 15, wherein said processor means includes means for defining a unique address for each network node by identifying a physical and a virtual subnet with which the node is affiliated, in said address.

19. The node structure of claim 15, wherein said routing means includes means for identifying a physical subnet with which either a source node or a destination node is affiliated, and for routing a part of the communications path within the identified physical subnet during said first transmission phase.

20. The node structure of claim 15, wherein said routing means includes means for identifying a virtual subnet with which either a source node or a destination node is affiliated, and for routing a part of the communications path through the identified virtual subnet during said second transmission phase.

21. The node structure of claim 15, wherein said routing means includes means for defining a shortest path that traverses at most a physical subnet and a virtual subnet.

22. The node structure of claim 15, wherein said routing means includes means for defining a long path that traverses at most three different subnets in an order of either physical-virtual-physical, or virtual-physical-virtual.

23. The node structure of claim 18, wherein said processor means comprises means for enabling a mobile node from a first physical subnet to join a second physical subnet, including means for assigning an address to the mobile node identifying the second physical subnet when the mobile node is located in the area of the second physical subnet.

24. The node structure of claim 23, wherein said processor means includes means for affiliating the mobile node with a virtual subnet that is available for a node entering the second physical subnet, and for identifying the available virtual subnet in the address assigned to the mobile node.

25. The node structure of claim 18, including means for updating a network node with addresses currently in use by other nodes in physical and virtual subnets in common with said network node.

26. The node structure of claim 25, wherein said updating means includes means for advertising the other nodes' current addresses to their logical neighboring nodes.

27. The node structure of claim 23, wherein said processor means includes means for assigning a guest address to a mobile node in the area of the second physical subnet when no virtual subnet is available for affiliation with the mobile node, and means for enabling the mobile node to be part of a communications path only during said first transmission phase.

* * * * *